May 22, 1962  C. G. LE VEZU  3,036,272
PULSE WIDTH DISCRIMINATOR
Filed June 27, 1957  2 Sheets-Sheet 1
Fig. 1.
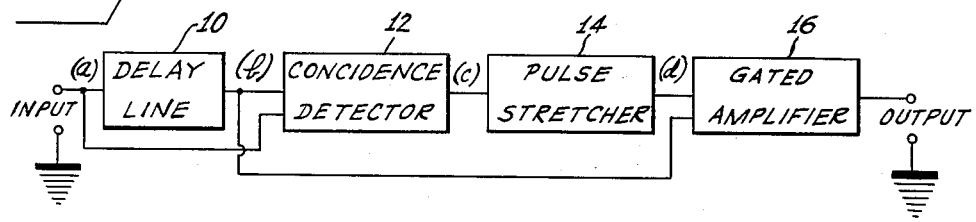
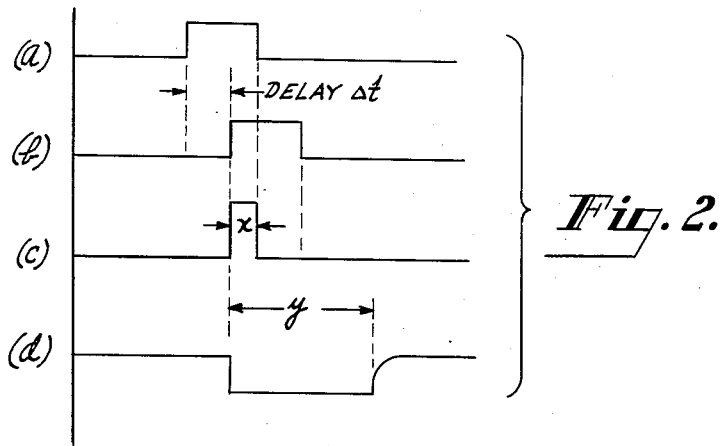
Fig. 2.
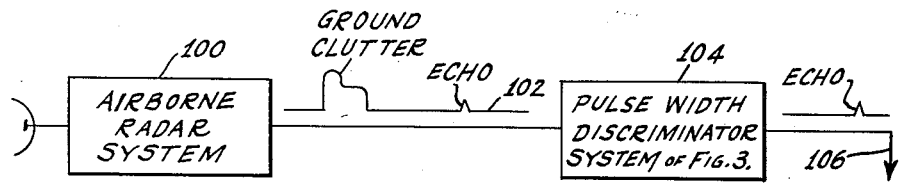
Fig 4.
INVENTOR.
CHARLES G. LE VEZU
BY
J. L. Whittaker
ATTORNEY

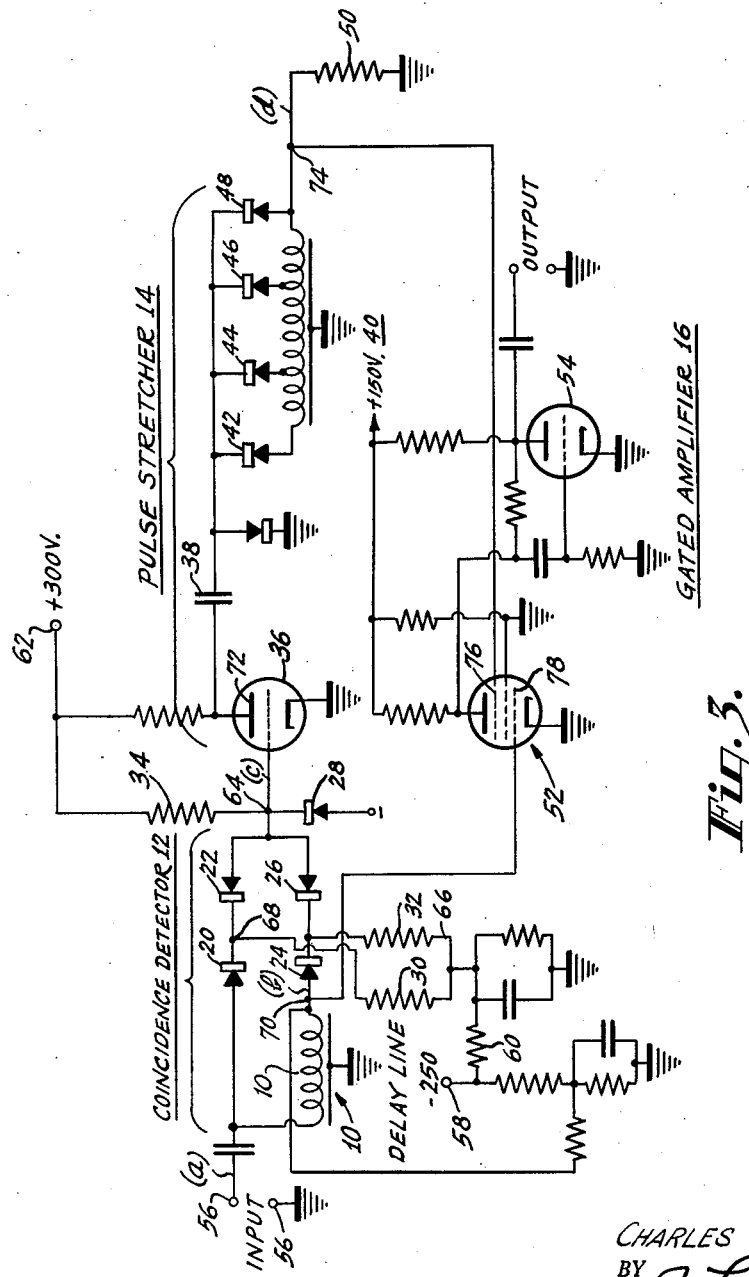

United States Patent Office 3,036,272
Patented May 22, 1962

3,036,272
PULSE WIDTH DISCRIMINATOR
Charles G. Le Vezu, Haddonfield, N.J., assignor to Radio Corporation of America, a corporation of Delaware
Filed June 27, 1957, Ser. No. 668,365
7 Claims. (Cl. 328—112)

The present invention relates to electrical circuits and particularly to improved circuits for sensing pulse duration.

It is an object of the present invention to provide improved circuits for discriminating against pulses of greater than a given duration.

Another object of the invention is to provide improved circuits for discriminating against pulses of smaller than a given duration.

Another object of this invention is to provide improved pulse width discriminator circuits which pass selected pulses in substantially their original form.

Yet another object of the invention is to provide improved pulse width discriminator circuits which are relatively insensitive to pulse shape.

Still another object of the invention is to provide, in a radar system, an improved circuit for eliminating ground clutter.

According to the invention, an input pulse is applied to a delay means and the delay means output pulse and input pulse are then applied to a coincidence circuit. If the input pulse has a duration greater than that of the delay introduced by the delay means, the coincidence circuit produces an output pulse. The output pulse is shaped and applied as a gate to a gate stage. The second input to the gate stage is the output pulse of the delay means. In one form of the invention, the gate stage is normally in condition to conduct and the gate polarity is such that it drives the gate stage to cutoff. In this form of the invention, pulses of smaller than a given duration pass through the gate stage, whereas pulses of greater than a given duration do not. In another form of the invention, the gate stage is normally cut off, and the gate pulse is of a polarity such that it renders the stage conductive. In this form of the invention, only pulses of greater than a given duration pass through the gate stage.

In a radar system, the input pulses consist of ground return and echoes. The ground return is a relatively long pulse. The radar system may therefore incorporate the form of the invention in which the gate stage is normally conductive for discriminating against the ground return. In this form of the invention, the shaper circuit consists of a pulse stretcher of the type producing a pulse having a duration proportional to the input pulse duration. When used in an airborne radar system—a system in which the ground return pulse duration may vary with variations in aircraft altitude or antenna position, the pulse stretcher automatically compensates for such variations.

The invention will be described in greater detail by reference to the following description taken in connection with the accompanying drawing in which:

FIGURE 1 is a block circuit diagram of an embodiment of the invention;

FIGURE 2 illustrates waveforms present at various places in the circuit of FIGURE 1;

FIGURE 3 is a schematic circuit diagram of one form of the present invention; and FIGURE 4 is a block circuit diagram of the system of this invention as incorporated in a radar system.

Throughout the figures similar reference numerals are applied to similar elements.

Referring to FIGURES 1 and 2, input pulses $a$ are applied to delay line 10 and to one input to coincidence detector 12. The second input to the coincidence detector consists of delayed pulses $b$. When the input pulses have a duration greater than the delay $\Delta t$ introduced by delay line 10, coincidence detector 12 produces an output pulse $c$. This pulse is stretched by pulse stretcher 14 and applied as one input $d$ to gated amplifier 16. The second input to the gated amplifier consists of the delayed pulses $b$.

In operation, when the input pulses have a duration greater than $\Delta t$, coincidence detector 12 produces an output pulse $c$ having a duration $x$. As will be explained in greater detail later, the pulse stretcher output pulse has a duration $y$ which depends upon the duration of input pulse $c$. In one form of the invention, pulse $y$ may be negative going and the gated amplifier 16 normally conductive. In this form of the invention pulse $d$ drives the gated amplifier below cutoff. The second input to the gated amplifier, pulse $b$, has its leading edge coincident with the leading edge of pulse $d$ and has a duration substantially shorter that of $d$. Accordingly, pulse $b$ cannot pass through the amplifier. On the other hand, if pulses $a$ and $b$ had a duration less than $\Delta t$, no pulse would be produced at $c$ and no gate pulse would be produced by the pulse stretcher 14. Accordingly, the delayed pulses $b$ would pass through normally conductive gated amplifier 16. Moreover, these pulses, although delayed, would pass through the amplifier substantially without distortion.

In a second form of the invention, the gated amplifier 16 is normally cutoff. Here, pulses $d$ are applied in such polarity as to render the amplifier conductive. For example, if the pulses $d$ are negative going, as shown, they may be applied to the cathode of an electron tube stage. On the other hand, pulses $d$ may be positive going and may be applied to a screen or suppressor grid of a pentode which is normally cutoff. In this form of the invention, pulses of smaller than a given duration do not pass through gated amplifier 16, however, pulses which are greater than a given duration do. As in the case of the first embodiment discussed, the pulses $b$ which pass through the amplifier retain substantially their original shape.

FIGURE 3 is a schematic circuit diagram of the first embodiment of the invention discussed above. The coincidence detector 12 includes diodes 20, 22, 24, 26 and 28 and resistors 30, 32, and 34. The pulse stretcher 14 includes a triode 36 followed by a coupling condenser 38 and delay line 40. The delay line is coupled to the anode lead of the triode by four diodes 42, 44, 46 and 48 and is terminated by a resistor 50 which approximately matches the characteristic impedance of the delay line. The gated amplifier 16 consists of a pentode 52, a triode 54 and associated circuits.

In operation, in the absence of an input pulse applied to terminals 56, diodes 22 and 26 conduct. Diode 22 conducts current from the negative terminal 58 through resistors 60 and 30, and then through resistor 34 to the positive terminal 62. Diode 26 conducts current from terminal 58 through resistor 60, resistor 32 and resistor 34 to positive terminal 62. When one or both of diodes 22, 26 conduct, a voltage is developed at point 64 which is sufficiently negative to drive triode 26 beyond cut off. Diode 28 is simply a clamper and prevents the voltage at point 64 from becoming more negative than a given value.

When a positive input pulse $a$ is applied to terminals 56, diode 20 conducts and current passes through this diode and resistor 30. Point 68 is thereby driven sufficiently positive to prevent current flow through diode 22. However, current still flows through diode 26 and the control grid of triode 36 is still sufficiently negative to maintain the triode beyond cutoff.

After a time $\Delta t$, the delay interval introduced by delay line 10, an output pulse $b$ is available at terminal 70, the output terminal of the delay line. This delayed positive pulse causes diode 24 to conduct and current flows through this diode and resistor 32. Diode 26 is thereby cut off. If the duration of the input pulse $a$ is sufficiently long so that diodes 22 and 26 are cut off simultaneously, in other words, if input pulse $a$ is longer than $\Delta t$, current is prevented from flowing through resistor 34. Point 64 now quickly rises toward the B+ voltage, whereby the triode 36 is driven into conduction. Anode 72 is now driven in a negative direction, whereby current flows through diodes 42, 44, 46, and 48. Condenser 38 and delay line 40 now become charged and a highly negative pulse $d$ is applied from terminal 74 to the suppressor grid 76 of pentode 52. The suppressor grid is driven sufficiently negative to prevent current flow through the pentode.

Upon the termination of pulse $c$, current again begins to flow through diode 22 and resistor 30, and the control grid of triode 36 is driven sufficiently negative to cut the triode off. Anode 72 now again quickly returns to the B+ voltage. However, diodes 42, 44, 46 and 48 are so poled that the delay line 40 cannot discharge through the diodes. Instead, the delay line must discharge into its terminating impedance 50.

In operation, the delay introduced by the delay line 40 is always made greater than $\Delta t$. Thus, after pulse $c$ has terminated, there is an additional delay introduced which is equal to the delay time of delay line 40. The reason for this is to prevent current from flowing in tube 52 until the delayed input pulse, which is applied to the control grid 78, has ended.

The purpose of triode 54 is to restore the original polarity of the pulse. It is coupled to vacuum tube 52 in feed-back pair configuration. The circuit valves are chosen to give an overall wide band width at unity gain.

Summarizing the above mode of operation, in brief, an input pulse $a$ is applied directly to a coincidence detector and to delay line 10 leading to the coincidence detector. If the pulse is shorter than a given duration, no pulse is produced at the output 64 of the coincidence detector and no gate pulse is applied to the pentode 52. The delayed input pulse $b$ is applied from terminal 70 to the control grid 78 of the pentode. The pentode normally conducts. Therefore, if the input pulse is shorter than a given duration, it passes through the pentode. On the other hand, if the input pulse is longer than a given duration, a highly positive pulse is produced at the output terminal 64 of the coincidence detector. This pulse is stretched in pulse stretcher circuit 14 and applied as a gate to pentode 52. In the embodiment of FIGURE 3 the pentode is cut off for the gate duration, and the output pulse $b$ of delay line 10 cannot pass through the pentode. The gate pulse duration is proportional to pulse $c$ which, in turn, is proportional to the input pulse duration.

In a form of the invention not illustrated in FIGURE 3, pentode 52 may normally be cut off and be rendered conductive by the gate pulse at terminal 74. This form of the invention has been discussed briefly in connection with FIGURE 1.

FIGURE 4 shows briefly how the system of the present invention may be incorporated in an airborne radar system. The radar system is shown by a single block 100. The output video pulses from the receiver during a single pulse repetition interval are shown at 102. The first pulse which is relatively long and which may vary in duration is the ground clutter pulse and the second one a target echo. These pulses are applied to the system of FIGURE 3 illustrated by a single block 104. The output of block 104 consists only of echo pulses and noise (not shown). The output may be applied via lead 106 to the indicator of block 100.

What is claimed is:

1. In combination, delay means; means for applying an input pulse to the delay means; a coincidence circuit connected to receive the delay means output pulse and the delay means input pulse for producing an output pulse only when portions of the two pulses are in time coincidence; a gate stage of the type responsive to the coincidental input of two pulses; circuit means for applying the delay means output pulse to said gate stage; and circuit means for applying the coincidence circuit output pulse, when one is present, to the gate stage.

2. In the combination as set forth in claim 1, said last-named circuit means including a pulse shaping circuit.

3. In the combination as set forth in claim 1, said last-named means including a pulse stretcher circuit of the type producing an output pulse having a duration related to that of the input pulse.

4. In combination, delay means; means for applying an input pulse to the delay means; a coincidence circuit connected to receive the delay means output pulse and the delay means input pulse for producing an output pulse only when portions of the two pulses are in time coincidence; a normally inoperative gate stage of the type responsive to the coincidental input of two pulses; circuit means for applying a delay means output pulse to said gate stage; and circuit means including a pulse stretcher for applying the coincidence circuit output pulse, when one is present, to the gate stage.

5. In the combination as set forth in claim 4, said delay means comprising a delay line and said pulse stretcher comprising a delay line of the type which produces an output pulse having a duration dependent upon the duration of the input pulse.

6. In combination, delay means; means for applying an input pulse to the delay means; a coincidence circuit connected to receive the delay means output pulse and the delay means input pulse for producing an output pulse only when portions of the two pulses are in time coincidence; a normally operative gate stage of the type responsive to the coincidental input of two pulses; circuit means for applying the delay means output pulse to said gate stage; and circuit means including a pulse stretcher for applying the coincidence circuit output pulse, when one is present, to the gate stage.

7. A pulse width discriminator comprising delay means to which different width pulses may be applied to produce delayed pulses having a certain delay, a coincidence circuit connected to receive both said delayed pulses and said pulses before they have been delayed whereby a gate pulse is produced only when an applied pulse has a duration greater than said certain delay, means for stretching said gate pulse to produce a stretched gate pulse having at least as great a width as that of the widest pulse included in the width discrimination range of the discriminator, a gate stage, means for applying said stretched gate pulse to said gate stage, and means for also applying said delayed pulses to said gate stage.

References Cited in the file of this patent

UNITED STATES PATENTS

| 2,211,942 | White | Aug. 20, 1940 |
| 2,764,678 | Craib | Sept. 25, 1956 |
| 2,784,310 | Cowan | Mar. 5, 1957 |
| 2,851,598 | Ostergren et al. | Sept. 9, 1958 |
| 2,874,279 | Miller | Feb. 17, 1959 |
| 2,879,504 | Howell et al. | Mar. 24, 1959 |

OTHER REFERENCES

"Pulse Width Discriminators," published in Electronics, June 1951, pages 105 to 107.